US008568939B2

(12) United States Patent
Yumita et al.

(10) Patent No.: US 8,568,939 B2
(45) Date of Patent: Oct. 29, 2013

(54) FUEL CELL INCLUDING FLUID-PERMEABLE MEMBERS OF DIFFERING THERMAL RESISTANCES WITH RESPECT TO AN ELECTROLYTIC MEMBRANE

(75) Inventors: Osamu Yumita, Gotenba (JP); Shinji Jomori, Susono (JP); Yoshihumi Oota, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1056 days.

(21) Appl. No.: 12/438,625

(22) PCT Filed: Aug. 22, 2007

(86) PCT No.: PCT/JP2007/066692
§ 371 (c)(1),
(2), (4) Date: Feb. 24, 2009

(87) PCT Pub. No.: WO2008/023822
PCT Pub. Date: Feb. 28, 2008

(65) Prior Publication Data
US 2010/0255403 A1 Oct. 7, 2010

(30) Foreign Application Priority Data

Aug. 24, 2006 (JP) ................................ 2006-228331

(51) Int. Cl.
H01M 8/10 (2006.01)
(52) U.S. Cl.
USPC .......................................... 429/483; 429/480
(58) Field of Classification Search
USPC ................................ 429/483, 480
See application file for complete search history.

(56) References Cited

U.S. PATENT DOCUMENTS

| 2002/0068215 | A1 | 6/2002 | Hamada et al. |
| 2002/0090543 | A1 | 7/2002 | Okamoto |
| 2002/0146616 | A1 | 10/2002 | Yasuo et al. |
| 2002/0192530 | A1 | 12/2002 | Kabumoto et al. |
| 2004/0033412 | A1* | 2/2004 | Enjoji et al. ............ 429/34 |
| 2005/0142432 | A1 | 6/2005 | Reiser |

FOREIGN PATENT DOCUMENTS

| JP | 63 10468 | 1/1988 |
| JP | 7-220734 | 8/1995 |
| JP | 2001 15138 | 1/2001 |
| JP | 2001-57218 | 2/2001 |
| JP | 2002 270197 | 9/2002 |
| JP | 2004 63095 | 2/2004 |

(Continued)

OTHER PUBLICATIONS

Office Action issued Dec. 8, 2010 in Canada Application No. 2,659,868.

*Primary Examiner* — Ula C Ruddock
*Assistant Examiner* — Frank Chernow
(74) *Attorney, Agent, or Firm* — Oblon, Spivak, McClelland, Maier & Neustadt, L.L.P.

(57) ABSTRACT

A fuel cell includes a membrane-electrode assembly, passageways provided on both sides of the membrane-electrode assembly, and fluid-permeable members provided between the membrane-electrode assembly and the passageways. Thermal resistance of the fluid-permeable member on an anode side is lower than that of the fluid-permeable member on a cathode side. In this case, heat flux at the anode side fluid-permeable member is increased, and heat flux at the cathode side fluid-permeable member is decreased.

19 Claims, 5 Drawing Sheets

(56) References Cited

FOREIGN PATENT DOCUMENTS

| | | |
|---|---|---|
| JP | 2004 63097 | 2/2004 |
| JP | 2004 63098 | 2/2004 |
| JP | 2004 185904 | 7/2004 |
| JP | 2005 71755 | 3/2005 |
| JP | 2005 65262 | 7/2005 |
| JP | 2005 197150 | 7/2005 |
| JP | 2006 502533 | 1/2006 |
| JP | 2006 164764 | 6/2006 |
| JP | 2006 164947 | 6/2006 |
| JP | 2007 214102 | 8/2007 |

* cited by examiner

ANODE SIDE                    CATHODE SIDE

ANODE SIDE

CATHODE SIDE

FUEL CELL INCLUDING FLUID-PERMEABLE MEMBERS OF DIFFERING THERMAL RESISTANCES WITH RESPECT TO AN ELECTROLYTIC MEMBRANE

TECHNICAL FIELD

This invention generally relates to a fuel cell.

BACKGROUND ART

In general, a fuel cell is a device that obtains electrical power from fuel, hydrogen and oxygen. Fuel cells are being widely developed as an energy supply system because fuel cells are environmentally superior and can achieve high energy-efficiency.

A fuel cell, in which a hydrogen electrode layer acting as a catalytic layer and a gas diffusion layer, a porous body layer made of sintered foam metal, and a flat separator are provided on one side of an electrolytic membrane in order, and an oxygen electrode layer acting as a catalytic layer and a gas diffusion layer, a porous body layer made of sintered foam metal, and a flat separator are provided on the other side of the electrolytic membrane in order, is disclosed (for example, with reference to Patent Document 1)

Patent Document 1: Japanese Patent Application Publication No. 2004-63095

DISCLOSURE OF THE INVENTION

Problems to be Solved by the Invention

The fuel cell disclosed in Patent Document 1 has a symmetrical structure with respect to the electrolytic membrane. In this case, property of electrical power generation may be degraded because of lack of water transferring from the cathode side to the anode side at high temperature operation.

The present invention has an object to provide a fuel cell that may restrain degradation of electrical power generation property at high temperature operation.

Means for Solving the Problems

A fuel cell in accordance with the present invention is characterized by including: a membrane-electrode assembly; passageways provided on both sides of the membrane-electrode assembly; and fluid-permeable members provided between the membrane-electrode assembly and the passageways. Thermal resistance of the fluid-permeable member on an anode side is lower than that of the fluid-permeable member on a cathode side.

In the fuel cell of the present invention, heat flux at the anode side fluid-permeable member is increased, and heat flux at the cathode side fluid-permeable member is decreased, because the thermal resistance at the anode side fluid-permeable member is smaller than that of the cathode side fluid-permeable member. In this case, it is possible to restrain the degradation of the electrical power generation property at high temperature operation of the fuel cell of the present invention.

The fluid-permeable members may include a gas diffusion layer. Thickness of the gas diffusion layer on the anode side may be smaller than that of the gas diffusion layer on the cathode side. In this case, the heat generated in the electrical power generation tends to be extracted to outside, because the thermal resistance on the anode side is reduced. It is possible to reduce the temperature of the fuel cell of the present invention effectively. Accordingly, it is possible to improve resistance property at highly-loaded operation. The gas diffusion layer on the anode side may be made of a material having thermal resistivity lower than that of a material composing the gas diffusion layer on the cathode side.

The gas diffusion layer may be only provided between a cathode of the membrane-electrode assembly and the passageway. In this case, the thermal resistance on the anode side is reduced. Gas permeability of the cathode side gas diffusion layer tends to be degraded because of remaining generated water or nitrogen gas. In contrast, hydrogen gas permeability of the anode side gas diffusion layer tends not to be degraded. That is, there is little influence on the hydrogen gas permeability of the anode side gas diffusion layer, even if water is remained at the anode side gas diffusion layer. This is because hydrogen molecule is very small. The hydrogen gas permeability on the anode side therefore tends not to be degraded, even if the anode side gas diffusion layer is omitted.

The fluid-permeable members may include a water-repellent layer. Thickness of the water-repellent layer on the anode side may be smaller than that of the water-repellent layer on the cathode side. In this case, the heat generated in the electrical power generation tends to be extracted to outside, because the thermal resistance on the anode side is reduced. It is therefore possible to reduce the temperature of the fuel cell of the present invention effectively. Accordingly, it is possible to improve resistance property at highly-loaded operation. The water-repellent layer on the anode side may be made of a material having thermal resistivity lower than a material composing the water-repellent layer on the cathode side. And, the fluid-permeable member may be only provided between a cathode of the membrane-electrode assembly and the passageway.

The gas diffusion layer may be made of a material having elasticity higher than that of the passageway. In this case, the gas diffusion layer may absorb dimension changing of each member. The passageway may be a three-dimensional mesh structure passageway. The three-dimensional mesh structure passageway may be made of a porous body. The porous body may be a metal porous body.

The fuel cell may further include a separator provided on the three-dimensional mesh structure passageway on an opposite side of the membrane-electrode assembly. A contacting face between the separator and the three-dimensional mesh structure passageway may be flat. In this case, contacting area between the separator and the three-dimensional mesh structure passageway is increased. Power collection efficiency is therefore improved. A water-repellent layer, the three-dimensional mesh structure passageway and a separator may be laminated on the membrane-electrode assembly on an anode side. And, a water-repellent layer, a gas diffusion layer, the three-dimensional mesh structure passageway and a separator may be laminated on the membrane-electrode assembly on a cathode side.

Effects of the Invention

In accordance with the present invention, degradation of electrical power generation property of a fuel cell at high temperature operation may be restrained.

BEST MODES FOR CARRYING OUT THE INVENTION

A description will be given of a best mode for carrying the present invention.

First Embodiment

Figure 1:
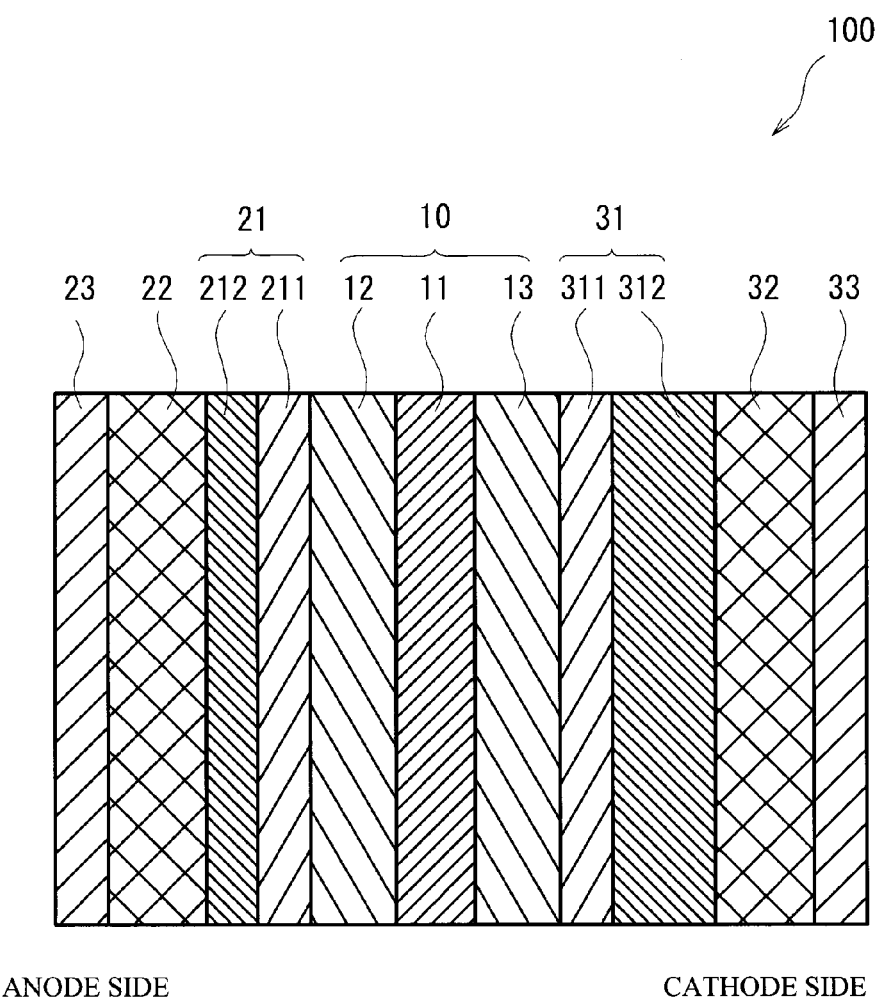
FIG. 1 illustrates a schematic cross sectional view of a fuel cell in accordance with a first embodiment of the present invention.

FIG. 1 illustrates a schematic cross sectional view of a fuel cell 100 in accordance with a first embodiment of the present invention. As illustrated in FIG. 1, the fuel cell 100 has a structure in which a fluid-permeable layer 21, a porous body passageway 22 and a separator 23 are laminated on one face of a membrane-electrode assembly 10, and a fluid-permeable layer 31, a porous body passageway 32 and a separator 33 are laminated on the other face of the membrane-electrode assembly 10.

The membrane-electrode assembly 10 has a structure in which an anode layer 12 is provided on one face of an electrolytic membrane 11, and a cathode layer 13 is provided on the other face of the electrolytic membrane 11. The fluid-permeable layer 21 includes a water-repellent layer 211 and a fuel gas diffusion layer 212. The water-repellent layer 211 is positioned on the side of the membrane-electrode assembly 10 compared to the fuel gas diffusion layer 212. The fluid-permeable layer 31 includes a water-repellent layer 311 and an oxidant gas diffusion layer 312. The water-repellent layer 311 is positioned on the side of the membrane-electrode assembly 10 compared to the oxidant gas diffusion layer 312.

The electrolytic membrane 11 is made of a proton-permeable solid polymer electrolyte such as nafion (registered trademark). The anode layer 12 and the cathode layer 13 are made of conductive material including catalyst, and are, for example, made of carbon supporting platinum. The anode layer 12 acts as a catalytic layer for promoting protonation of hydrogen. The cathode layer 13 acts as a catalytic layer for promoting a reaction between proton and oxygen.

The water-repellent layers 211 and 311 are made of a material having water repellency, conductivity and gas permeability such as PTFE (polytetrafluoroethylene) including carbon. The water-repellent layers 211 and 311 have gas permeability and restrain adverse current of generated water toward the electrode layer. It is therefore possible to restrain trouble caused by retention of water at the electrode layer. Thickness of the water-repellent layers 211 and 311 are substantially equal to each other, and is, for example, 10 μm to 200 μm.

The fuel gas diffusion layer 212 and the oxidant gas diffusion layer 312 are made of a material having conductivity and gas permeability such as a carbon paper or a carbon cloth. The oxidant gas diffusion layer 312 has thickness of approximately 50 μm to 300 μm. In the embodiment, the thickness of the fuel gas diffusion layer 212 is smaller than that of the oxidant gas diffusion layer 312. Therefore, thermal resistance of the fuel gas diffusion layer 212 is smaller than that of the oxidant gas diffusion layer 312. Accordingly, whole thermal resistance of the fluid-permeable layer 21 is smaller than that of the fluid-permeable layer 31.

The fuel gas diffusion layer 212 and the oxidant gas diffusion layer 312 move gas to the electrode layer. That is, the fuel gas provided to the fuel gas diffusion layer 212 diffuses mainly toward the anode layer 12. The oxidant gas provided to the oxidant gas diffusion layer 312 diffuses mainly toward the cathode layer 13. The water generated in electrical power generation can permeate the fuel gas diffusion layer 212 and the oxidant gas diffusion layer 312 toward the porous body passageway. It is preferable that the fuel gas diffusion layer 212 and the oxidant gas diffusion layer 312 are made of a material having elasticity higher than the porous body passageways 22 and 32. This is because the fuel gas diffusion layer 212 and the oxidant gas diffusion layer 312 absorb dimension changing of each part of the fuel cell 100.

The porous body passageways 22 and 32 are made of a conductive porous body. In the embodiment, the porous body passageways 22 and 32 are made of a metal porous body such as sintered foam metal. The porous body passageways 22 and 32 act as a gas passageway for providing gas to the whole face of the membrane-electrode assembly 10. That is, the fuel gas provided to the porous body passageway 22 flows mainly in parallel with the fluid-permeable layer 21. The oxidant gas provided to the porous body passageway 32 flows mainly in parallel with the fluid-permeable layer 31. Thus, the function of the porous body passageways 22 and 32 is different from that of the fuel gas diffusion layer 212, the oxidant gas diffusion layer 312 and the water-repellent layers 211 and 311.

The separators 23 and 33 are made of flat conductive material, and are made of metal such as stainless steel. A contact area between the separator 23 and the porous body passageway 22 and a contact area between the separator 33 and the porous body passageway 32 are therefore enlarged. Accordingly, efficiency of electrical power collection is improved. In FIG. 1, one cell is illustrated in order to simplify explanation. In an actual fuel cell, a plurality of the fuel cells are stacked.

Next, a description will be given of an operation of the fuel cell 100. Fuel gas including hydrogen is provided to the porous body passageway 22. The fuel gas flows in the porous body passageway 22, and gets to the fuel gas diffusion layer 212, permeates the fuel gas diffusion layer 212 and the water-repellent layer 211 and gets to the anode layer 12. The hydrogen in the fuel gas at the anode layer 12 is divided into a proton and an electron. The proton is conducted in the electrolytic membrane 11 and gets to the cathode layer 13.

On the other hand, oxidant gas including oxygen is provided to the porous body passageway 32. The oxidant gas flows in the porous body passageway 32, permeates the oxidant gas diffusion layer 312 and the water-repellent layer 311 and gets to the cathode layer 13. Water and electrical power are generated from oxygen in the oxidant gas and the proton at the cathode layer 13. The generated electrical power is collected through the separators 23 and 33. With this operation, the fuel cell 100 generates the electrical power.

The water generated in electrical power generation passes through the fuel gas diffusion layer 212, the oxidant gas diffusion layer 312 and the water-repellent layers 211 and 311, and gets to the porous body passageway. The generated water is efficiently transferred to the side of the porous body passageway, because the water-repellent layers 211 and 311 have water repellency. In this case, retention of the generated water is restrained. It is therefore possible to restrain flooding at low-temperature operation. Accordingly, the reduction of electrical-power generation efficiency of the fuel cell 100 is restrained.

Heat is generated in electrical power generation. The temperature of the cathode layer 13 is therefore the highest. The generated heat is conducted through the fluid-permeable layer 31, the porous body passageway 32 and the separator 33, and is conducted through the fluid-permeable layer 21, the porous body passageway 22 and the separator 23. For example, the heat generated in electrical power generation can be extracted to outside, when the separators 23 and 33 contact with circulating cooling medium. It is therefore possible to control the temperature of the fuel cell 100 to be under a predetermined value.

In the embodiment, total thermal resistance of the fluid-permeable layers 21 and 31 is reduced, when the thickness of the fuel gas diffusion layer 212 is reduced. In this case, the heat generated in electrical power generation tends to be extracted to outside. It is therefore possible to reduce the temperature of the fuel cell 100 efficiently. It is accordingly possible to improve the resistance property of the fuel cell 100 at highly-loaded operation.

Heat flux is increased in the fluid-permeable layer 21 and heat flux is decreased in the fluid-permeable layer 31, because a thermal resistance of the fluid-permeable layer 21 is lower than a thermal resistance of the fluid-permeable layer 31. In this case, it is thought that an amount of water transferred from the cathode layer 13 to the anode side is increased by soret effect. It is therefore thought that an amount of water required for the electrolytic membrane 11 is secured. Accordingly, it is possible to restrain reduction of electrical-power-generation property at high temperature operation of the fuel cell 100.

A thermal resistance between the cathode layer 13 and the separator 23 is smaller than that a thermal resistance between the cathode layer 13 and the separator 33, when a thermal resistance of the electrolytic membrane 11 is smaller than a thermal resistance differential between the fluid-permeable layer 21 and the fluid permeable layer 31. The thermal resistance differential between the fluid-permeable layer 21 and the fluid-permeable layer 31 being a mathematical difference of a value of the thermal resistance of the fluid-permeable layer 21 and a value of the thermal resistance of the fluid permeable layer 31. In this case, the temperature of the anode side is lower than that of the cathode side.

The thickness of the fuel gas diffusion layer 212 is smaller than that of the oxidant gas diffusion layer 312 and the thermal resistance of the fluid-permeable layer 21 is smaller than that of the fluid-permeable layer 31, in the embodiment. However, the structure is not limited. For example, thermal resistivity of the material composing the fuel gas diffusion layer 212 has only to be smaller than that of the material composing the oxidant gas diffusion layer 312, even if the thickness of the fuel gas diffusion layer 212 is equal to that of the oxidant gas diffusion layer 312. For example, the thermal resistance of the fluid-permeable layer 21 is smaller than that of the fluid-permeable layer 31, when the fuel gas diffusion layer 212 is made of carbon cloth and the oxidant gas diffusion layer 312 is made of carbon paper.

The thermal resistance of the fluid-permeable layer 21 is smaller than that of the fluid-permeable layer 31 when fiber diameter of the fuel gas diffusion layer 212 is larger than that of the oxidant gas diffusion layer 312, even if the fuel gas diffusion layer 212 and the oxidant gas diffusion layer 312 are made of the same material. The thickness of the water-repellent layer 211 may be smaller than that of the water-repellent layer 311, and the thermal resistance of the fluid-permeable layer 21 may be smaller than that of the fluid-permeable layer 31. The material composing the water-repellent layer 211 may be different from that composing the water-repellent layer 311, and the thermal resistance of the fluid-permeable layer 21 may be smaller than that of the fluid-permeable layer 31. For example, it is possible to reduce the thermal resistance of the water-repellent layer 211 by controlling the carbon ratio of the water-repellent layer 211 to be higher than that of the water-repellent layer 311.

The effect of the present invention may be obtained when the thermal resistance of the fluid-permeable layer 21 is smaller than that of the fluid-permeable layer 31 based on at least one of the conditions such as material, material quality, thickness and so on of the fuel gas diffusion layer 212, the oxidant gas diffusion layer 312 and the water-repellent layers 211 and 311. In the embodiment, the porous body passageway is used as a three dimensional mesh structure passageway. However, a three-dimensional passageway such as a multilayered expanded metal may be used instead of the porous body passageway.

In the embodiment, the porous body passageways 22 and 32 correspond to the three-dimensional mesh structure passageway. The fuel gas diffusion layer 212, the oxidant gas diffusion layer 312 and the water-repellent layers 211 and 311 correspond to the fluid-permeable member.

Second Embodiment

Figure 2:
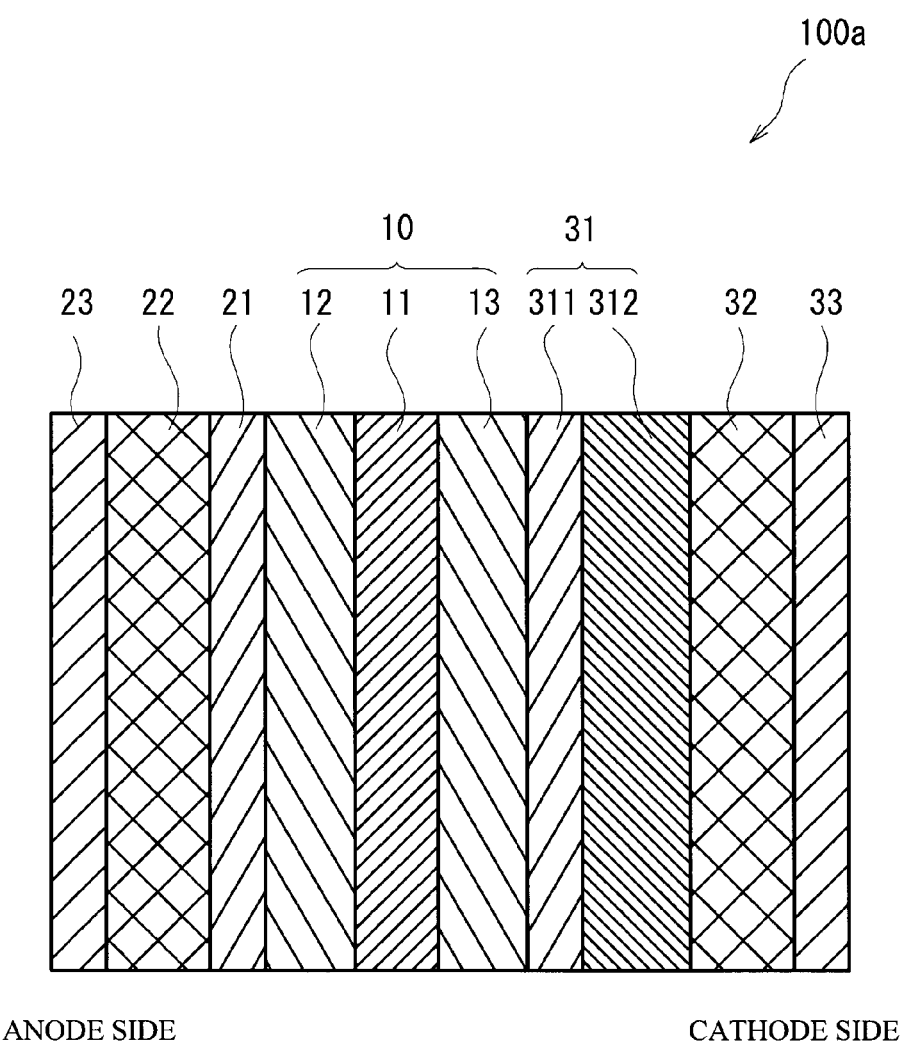
FIG. 2 illustrates a schematic cross sectional view of a fuel cell in accordance with a second embodiment of the present invention.

Next, a description will be given of a fuel cell 100a in accordance with a second embodiment of the present invention. FIG. 2 illustrates a schematic cross sectional view of the fuel cell 100a. As illustrated in FIG. 2, the fuel cell 100a is different from the fuel cell 100 illustrated in FIG. 1 in a point that the fuel gas diffusion layer 212 is not provided. In this case, the thermal resistance on the anode side is more reduced, compared to the fuel cell 100. It is therefore possible to extract the heat generated in the electrical power generation to outside. Accordingly, it is possible to reduce the temperature of the fuel cell 100a effectively. This results in improvement of the resistance property of the fuel cell 100a at highly loaded operation.

The heat flux at the fluid-permeable layer 21 is further increased, and the heat flux at the fluid-permeable layer 31 is further reduced. In this case, it is thought that water amount transferred from the cathode layer 13 toward the anode side is further increased. It is therefore thought that water amount required for the electrolytic membrane 11 is secured. This results in restraint of reduction of electrical power property of the fuel cell 100a at high-temperature operation.

Gas permeability of the oxidant gas diffusion layer 312 tends to be degraded by the remaining generated-water or nitrogen gas. In contrast, hydrogen permeability of the fuel gas diffusion layer 212 tends not to be degraded. That is, there is little influence on hydrogen gas permeability of the fuel gas diffusion layer 212, even if water is remained at the fuel gas diffusion layer 212. This is because hydrogen molecule is very small. The hydrogen gas permeability of the anode side therefore tends not to be degraded, even if the fuel gas diffusion layer 212 is not provided as in the case of the embodiment in FIG. 2.

If a separator having a passageway groove is provided instead of the porous body passageway 22 and the separator 23 in the fuel cell 100a, hydrogen provision to the anode layer 12 under a rib of the separator is extremely reduced. In this case, the electrode area contributing to electrical power generation is reduced. In contrast, hydrogen gas is provided to the whole of the electrode even if the fuel gas diffusion layer 212 is not provided, because the porous body passageway 22 having three-dimensional mesh structure is provided in the fuel cell 100a.

Example

The fuel cell in accordance with the above-mentioned embodiment was manufactured, and properties of the fuel cell were measured.

Example

The fuel cell 100a in accordance with the second embodiment was manufactured in an example. Fluorine layer having thickness of 25 μm was used as the electrolytic membrane 11. Pt-supporting carbon having thickness of 5 μm was used as the anode layer 12 and the cathode layer 13. Carbon cloth having thickness of 200 μm was used as the oxidant gas diffusion layer 312. For water repellant layers 211 and 311, 40% PTFE and 60% carbon having thickness of 50 μm was used.

Comparative Example 1

In a comparative example 1, a fuel gas diffusion layer was provided between the water-repellent layer 211 and the porous body passageway 22 in the fuel cell of the example. The fuel gas diffusion layer had the same composition and thickness as the oxidant gas diffusion layer 312 of the example.

Comparative Example 2

In a comparative example 2, the oxidant gas diffusion layer was not provided and a fuel gas diffusion layer was provided between the water-repellent layer 211 and the porous body passageway 22 in the fuel cell of the example. The fuel gas diffusion layer had the same composition and thickness as the oxidant gas diffusion layer 312 of the example.

(Analysis 1)

Figure 3:
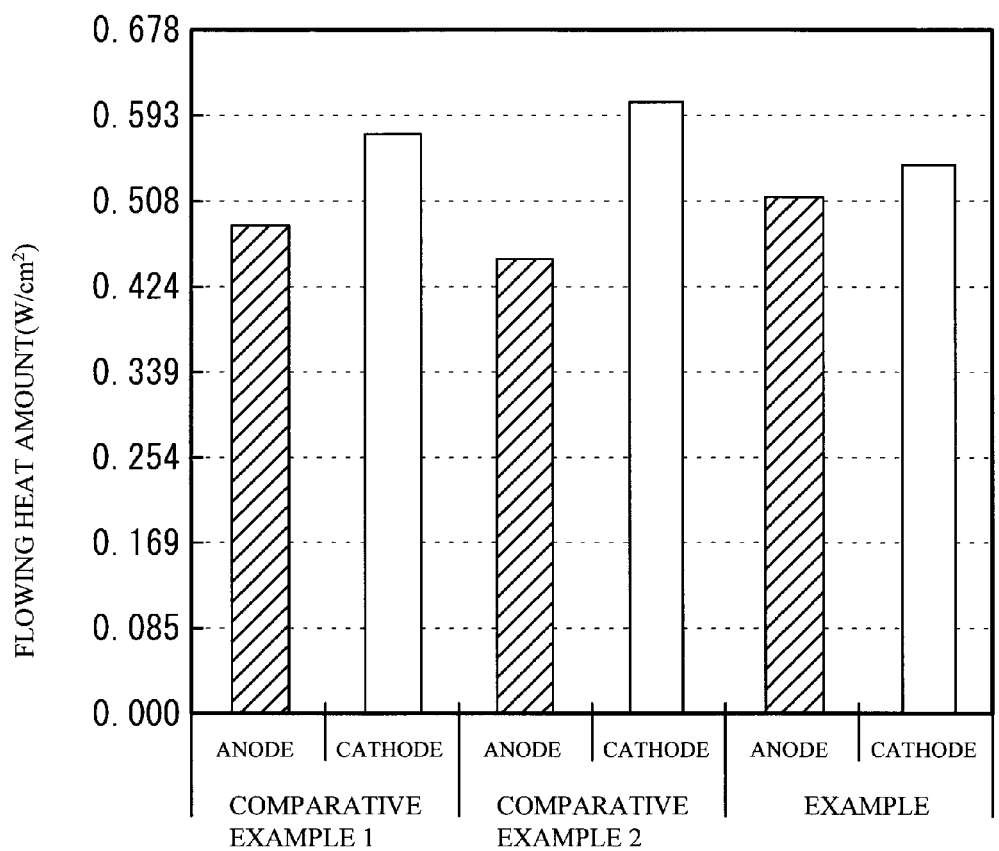
FIG. 3 illustrates an amount of heat flowing into an anode side separator and a cathode side separator.

Distribution of heat generated in electrical power generation of the fuel cells of the example, the comparative example 1, and the comparative example 2 toward the anode side and the cathode side was measured. In concrete, the fuel cells generated heat under a condition of 1.8 A/cm$^2$ current and 0.52 V output voltage, and amount of heat flowing into the anode side separator and the cathode side separator was measured. FIG. 3 illustrates the result. A vertical axis of FIG. 3 indicates flowing heat amount (W/cm$^2$).

As illustrated in FIG. 3, amount of heat flowing into the cathode side separator was larger than that flowing into the anode side separator, in the fuel cell of the comparative example 1. It is thought that this is because the thermal resistance on the anode side is substantially equal to that on the cathode side and heat is generated at the cathode layer. Amount of heat flowing into the cathode side separator was further larger than that flowing into the anode side separator, in the fuel cell of the comparative example 2. It is thought that this is because the thermal resistance on the cathode side was lower than that on the anode side.

On the other hand, there was little difference between the heat flowing into the anode side separator and the heat flowing into the cathode side separator, in the fuel cell of the example. It is thought that this is because the thermal resistance on the anode side was reduced and the heat flux on the anode side was increased. It is thought that the water generated in electrical power generation tends to be transferred to the anode side with the soret effect.

(Analysis 2)

Figure 4:
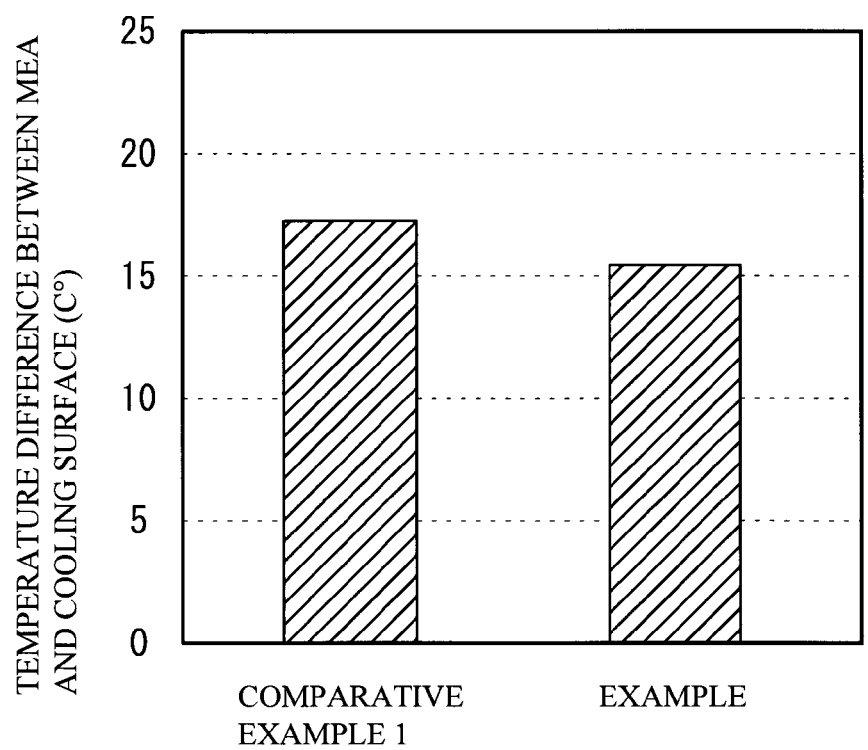
FIG. 4 illustrates a temperature reduction width between a membrane-electrode assembly and a cooling surface of the cathode side separator.

Next, temperature reduction width between the membrane-electrode assembly and a cooling surface of the cathode side separator was measured with respect to the fuel cells of the example and the comparative example 1. In analysis 2, the fuel cells generated heat under a condition of 1.8 A/cm$^2$ current and 0.52 V output voltage. FIG. 4 illustrates the result. A vertical axis in FIG. 4 indicates the temperature reduction width between the membrane-electrode assembly and the cooling surface of the cathode side separator.

As illustrated in FIG. 4, the temperature difference of the fuel cell of the example was reduced, compared to that of the comparative example 1. This shows that the surface temperature of the MEA (Membrane-Electrode Assembly) was lower than that of the comparative example 1 in a case of comparison at the same cooling surface temperature. It is thought that this is because the whole thermal resistance on the anode side and the cathode side was reduced in the fuel cell of the example. It is therefore thought that resistance property at highly loaded operation is improved with respect to the fuel cell of the example.

(Analysis 3)

Figure 5:
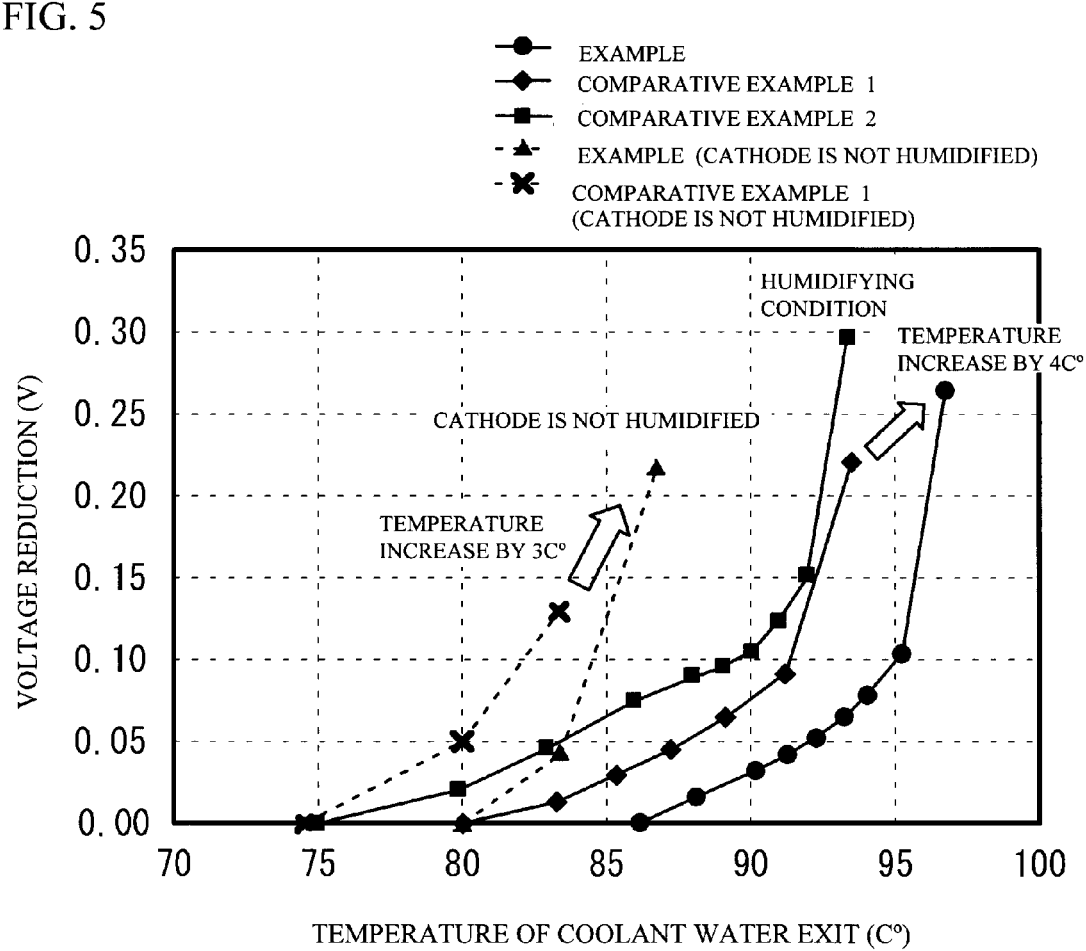
FIG. 5 illustrates a relationship between a reduction width of an output voltage and temperature of each fuel cell.

Next, a relationship between the reduction width of the output voltage and the temperature of the fuel cell was measured. FIG. 5 illustrates the result. A vertical axis of FIG. 5 indicates voltage reduction width from the maximum output voltage of the fuel cells. A horizontal axis of FIG. 5 indicates the temperature at coolant water exit of the fuel cells. The temperature of the coolant water exit is a barometer of the temperature of the fuel cell. A dotted line of FIG. 5 indicates the voltage reduction width of the fuel cells of the example and the comparative example 1 in a case where humidification temperature on the anode side and the cathode side was respectively 45 degrees C. and 55 degrees C.

As illustrated in FIG. 5, output voltage of the fuel cell of the example was not reduced to a higher temperature, compared to the fuel cell of the comparative example 1, if the cathode was not humidified. The maximum temperature where the fuel cell of the example can generate electrical power was higher than that of the fuel cell of the comparative example 1 by 3 degrees C., if the cathode was not humidified. The output voltage was not reduced to a higher temperature, compared to the fuel cell of the comparative examples 1 and 2, even if the cathode was humidified. The maximum temperature where the fuel cell of the example can generate electrical power was higher than that of the fuel cells of the comparative examples 1 and 2 by 4 degrees C., if the cathode was humidified.

The temperature of the fuel cell of the example where the output voltage was reduced was increased, compared to the fuel cells of the comparative examples 1 and 2, when the cathode was humidified and not humidified. The maximum temperature of the fuel cell of the example where electrical power can be generated was increased, compared to the fuel cells of the comparative examples 1 and 2. This shows that the degradation of the property of the electrical power generation was restrained at high temperature operation of the fuel cell of the example. It is thought that this is because the reduction of water amount of the electrolytic membrane was restrained when the water generated in the electrical power generation was transferred to the anode side.

The invention claimed is:

1. A fuel cell comprising:
   a membrane-electrode assembly including an anode, a cathode, and an electrolytic membrane;

passageways provided on both sides of the membrane-electrode assembly; and fluid-permeable members provided between the membrane-electrode assembly and the passageways, wherein a thermal resistance of a fluid-permeable member on an anode side is lower than a thermal resistance of a fluid-permeable member on a cathode side, based on a condition of at least one of a material, a material quality, and a thickness of the fluid-permeable members, wherein one of the fluid-permeable member on the anode side and the fluid-permeable member on the cathode side is a first fluid-permeable member and includes a first water-repellant layer disposed on the membrane-electrode assembly and a first gas diffusion layer adjacent to and between the first water-repellant layer and one of the passageways, the first water-repellant layer being made of polytetrafluoroethylene (PTFE) including carbon, the first gas diffusion layer being made of a carbon paper or a carbon cloth, wherein a thermal resistance of the electrolytic membrane is smaller than a thermal resistance differential between the fluid-permeable members, based on a condition of at least one of a material, a material quality, and a thickness of the fluid-permeable members and the electrolytic membrane.

2. The fuel cell as claimed in claim 1 wherein the other of the fluid-permeable member on the anode side and the fluid-permeable member on the cathode side is a second fluid-permeable member and includes a second gas diffusion layer, wherein a thickness of one of the first and second gas diffusion layers is smaller than a thickness of the other of the first and second gas diffusion layers.

3. The fuel cell as claimed in claim 1 wherein the other of the fluid-permeable member on the anode side and the fluid-permeable member on the cathode side is a second fluid-permeable member and includes a second gas diffusion layer made of one of a carbon paper and a carbon cloth, wherein one of the first and second gas diffusion layers is made of a material having a thermal resistivity lower than a thermal resistivity of a material composing the other of the first and second gas diffusion layers.

4. The fuel cell as claimed in claim 1 wherein the first gas diffusion layer is the only gas diffusion layer and is provided between the cathode of the membrane-electrode assembly and the one passageway, wherein the one passageway is on the cathode side.

5. The fuel cell as claimed in claim 1 wherein the other of the fluid-permeable member on the anode side and the fluid-permeable member on the cathode side is a second fluid-permeable member and includes a second water-repellent layer made of polytetrafluoroethylene (PTFE) including carbon disposed on the membrane-electrode assembly.

6. The fuel cell as claimed in claim 5 wherein a thickness of the one of the first and second water-repellent layers provided on the anode side is smaller than a thickness of the other of the first and second water-repellent layers provided on the cathode side.

7. The fuel cell as claimed in claim 5 wherein the one of the first and second water-repellent layers provided on the anode side is made of a material having a thermal resistivity lower than a thermal resistivity of a material composing the other of the first and second water-repellent layers provided on the cathode side.

8. The fuel cell as claimed in claim 5 wherein the first gas diffusion layer is the only gas diffusion layer and is provided between a cathode of the membrane-electrode assembly and the one passageway, wherein the one passageway is on the cathode side.

9. The fuel cell as claimed in claim 1 wherein the first gas diffusion layer is made of a material having an elasticity higher than an elasticity of at least one of the passageways.

10. The fuel cell as claimed in claim 1 wherein at least one of the passageways is a three-dimensional mesh structure passageway.

11. The fuel cell as claimed in claim 10 wherein the three-dimensional mesh structure passageway is made of a porous body.

12. The fuel cell as claimed in claim 11 wherein the porous body is a metal porous body.

13. The fuel cell as claimed in claim 10 further comprising a separator provided on a side of the three-dimensional mesh structure passageway opposite of a membrane-electrode assembly side of the three-dimensional mesh structure passageway.

14. The fuel cell as claimed in claim 13 wherein a contacting face between the separator and the three-dimensional mesh structure passageway is flat.

15. The fuel cell as claimed in claim 1 wherein:

the passageways are three-dimensional mesh structure passageways, the fluid-permeable member on the cathode side includes the first water-repellant member and first gas diffusion layer, the fluid-permeable member on the anode side includes a second water-repellant member, the first water-repellent layer, the first gas diffusion layer, the one of the passageways, and a first separator are laminated on the membrane-electrode assembly on a cathode side in that order from the cathode; and the second water-repellent layer, the other of the passageways, and a second separator, are laminated on the membrane-electrode assembly on an anode side in that order from the anode.

16. The fuel cell as claimed in claim 1 wherein the fluid-permeable member on the cathode side includes the first gas diffusion layer and the fluid-permeable member on the anode side includes a second gas diffusion layer, and wherein a thickness of the first gas diffusion layer is equal to a thickness of the second gas diffusion layer.

17. The fuel cell as claimed in claim 1 wherein the fluid-permeable member on the cathode side includes the first gas diffusion layer and the fluid-permeable member on the anode side includes a second gas diffusion layer, and wherein the first and second gas diffusion layers are made from one material, and wherein a fiber diameter of the one material forming the first gas diffusion layer is smaller than a fiber diameter of the one material forming the second gas diffusion layer.

18. The fuel cell as claimed in claim 5 wherein the other of the fluid-permeable members includes a second gas diffusion layer, and wherein a thickness of one of the first and second gas diffusion layers is smaller than a thickness of the other of the first and second gas diffusion layers.

19. The fuel cell as claimed in claim 5 wherein the fluid-permeable member on the cathode side includes the first gas diffusion layer and the fluid-permeable member on the anode side includes a second gas diffusion layer, and wherein a thickness of the first gas diffusion layer is equal to a thickness of the second gas diffusion layer.

* * * * *